US011939920B1

(12) United States Patent
Costello et al.

(10) Patent No.: US 11,939,920 B1
(45) Date of Patent: Mar. 26, 2024

(54) ULTRA HIGH TEMPERATURE SPEED SENSOR SYSTEM IN A GAS TURBINE ENGINE

(71) Applicants: Rolls-Royce Corporation, Indianapolis, IN (US); Rolls-Royce North American Technologies Inc., Indianapolis, IN (US)

(72) Inventors: John Joseph Costello, Indianapolis, IN (US); Jeremy Gallagher, Indianapolis, IN (US); Trevor Pfeil, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 18/165,074

(22) Filed: Feb. 6, 2023

(51) Int. Cl.
*F02C 7/12* (2006.01)
*F01D 17/02* (2006.01)
*F01D 25/12* (2006.01)

(52) U.S. Cl.
CPC ............... *F02C 7/12* (2013.01); *F01D 17/02* (2013.01); *F01D 25/12* (2013.01); *F05D 2220/32* (2013.01); *F05D 2260/213* (2013.01); *F05D 2260/80* (2013.01)

(58) Field of Classification Search
CPC . F02C 7/12; F01D 17/02; F01D 25/12; F05D 2220/32; F05D 2260/213; F05D 2260/80
See application file for complete search history.

(56) References Cited

U.S. PATENT DOCUMENTS

| 9,353,760 | B2 | 5/2016 | Chekansky |
| 10,294,949 | B2 | 5/2019 | Bergamini et al. |
| 10,495,659 | B2 | 12/2019 | Costello et al. |
| 10,976,221 | B2 * | 4/2021 | Turner ............... G01L 3/101 |
| 11,073,085 | B2 * | 7/2021 | Staubach ............ F02K 3/077 |
| 2013/0298686 | A1 | 11/2013 | Royer et al. |

(Continued)

FOREIGN PATENT DOCUMENTS

| CN | 214895378 U | * 11/2021 |
| EP | 3 112 608 B1 | 8/2020 |

OTHER PUBLICATIONS

Costello, J.J., and Pickard, A.C., A Novel Speed Measurement System for Turbomachinery, Dec. 2018, pp. 1-4, IEEE Sensors Council, IEEE Sensors Letters: vol. 2, No. 4.

*Primary Examiner* — Jesse S Bogue
(74) *Attorney, Agent, or Firm* — Shumaker & Sieffert, P.A.

(57) ABSTRACT

A turbine engine may include a compressor section of the turbine engine. The turbine engine may include a combustion section of the turbine engine. The combustion section may be downstream of the compressor section. The turbine engine may include a turbine section of the turbine engine. The turbine section may be downstream of the combustion section. The turbine engine may include a sensor for speed detection. The sensor may be disposed at an upstream segment of the turbine section. The sensor may include a cooling jacket. The cooling jacket may encase at least a portion of the sensor. A cooling fluid may be in fluid communication with the cooling jacket and an outer surface of the sensor. The cooling jacket may be shaped to direct cooling fluid around the sensor.

19 Claims, 11 Drawing Sheets

(56) References Cited

U.S. PATENT DOCUMENTS

| | | | |
|---|---|---|---|
| 2015/0198091 A1* | 7/2015 | Lefebvre | F01D 17/24 |
| | | | 165/104.33 |
| 2016/0305974 A1* | 10/2016 | Webster | G07C 5/0816 |
| 2018/0334965 A1* | 11/2018 | Ortiz | F02C 9/18 |
| 2022/0243608 A1 | 8/2022 | Krzywon | |

* cited by examiner

| Coaxial Cooling Configuration | | | | | | |
|---|---|---|---|---|---|---|
| Simple Coaxial Geometry | | | End Accelerator Coaxial Geometry | | | |
| Cooling Air Temp °F | Pressure Differential ΔP-PSID | Mass Flow lb/sec | Probe Temperature °F | Cooling Air Temp °F | Pressure Differential ΔP-PSID | Mass Flow lb/sec | Probe Temperature °F |
| 650 | 50 | 0.0046 | ≤950 | 650 | 50 | 0.0021 | ≤950 |

FIG. 8

Analysis of Simple Jacket Cooling Configuration w/200 °F Air Supply

FIG. 9

Analysis of Accelerator Jacket Cooling Configuration w/200 °F Air Supply

ULTRA HIGH TEMPERATURE SPEED SENSOR SYSTEM IN A GAS TURBINE ENGINE

TECHNICAL FIELD

This disclosure relates to speed sensor systems and, more particularly, to speed sensor(s) systems placed in high temperature area(s) of a gas turbine engine.

BACKGROUND

Present speed sensors systems suffer from a variety of drawbacks, limitations, and disadvantages, in particular, with their design to withstand high temperatures. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A turbine engine may include a compressor section of the turbine engine. The turbine engine may include a combustion section of the turbine engine. The combustion section may be downstream of the compressor section. The turbine engine may include a turbine section of the turbine engine. The turbine section may be downstream of the combustion section. The turbine engine may include a sensor for speed detection. The sensor may be disposed at an upstream segment of the turbine section.

The sensor may include a cooling jacket. The cooling jacket may encase at least a portion of the sensor. A cooling fluid may be in fluid communication with the cooling jacket and an outer surface of the sensor. The cooling jacket may be shaped and/or designed to direct cooling fluid around the sensor.

A method of cooling the sensor in the turbine engine may include starting and rotating the turbine engine. An inner cross-sectional area of the cooling jacket may be larger than an outer cross sectional area of the sensor. The method may include directing cooling fluid through the cooling jacket. The cooling fluid may cool the outer surface of the sensor. The method may include directing the cooling fluid out of the cooling jacket through a hole disposed at an end of the cooling jacket.

One interesting feature of the systems and methods described below may be that the cooling jacket may cool the sensor to and keep the sensor and sensor components within the sensor's maximum allowable temperature range. Alternatively, or in addition, an interesting feature of the systems and methods described below may be that the cooling provided by the cooling jacket may allow the sensor to be used in areas that reach relatively high temperatures, for example, in areas that exceed the sensor's maximum allowable temperature. For example, the cooling jacket may enable the sensor to be positioned in a front or upstream segment of a turbine engine where, during operation of the turbine engine, ambient temperatures exceed the maximum temperatures of the materials of sensors. Placing the sensor in the upstream segment of the turbine engine, for example, would allow a main shaft break to be considered between each individual turbine disc and therefore detect a potential over-speed condition of the engine. Placement of the sensor in the upstream segment of the turbine engine allows the sensor to be used to detect an over-speed event on any or all of the turbine discs.

Additionally, another interesting feature of such a cooling jacket is that it enables the use of sensors, such as VR sensors, materials and manufacturing methods. This enables a lower cost solution as compared to alternative speed measurement technologies such as microwave, optical or capacitive sensors. Additionally, the geometry of the cooling jacket and supply of cooling fluid can be altered such that the maximum temperature experienced by the sensor can be reduced and tailored based around cooling air temperature and mass flow.

Figure 1:
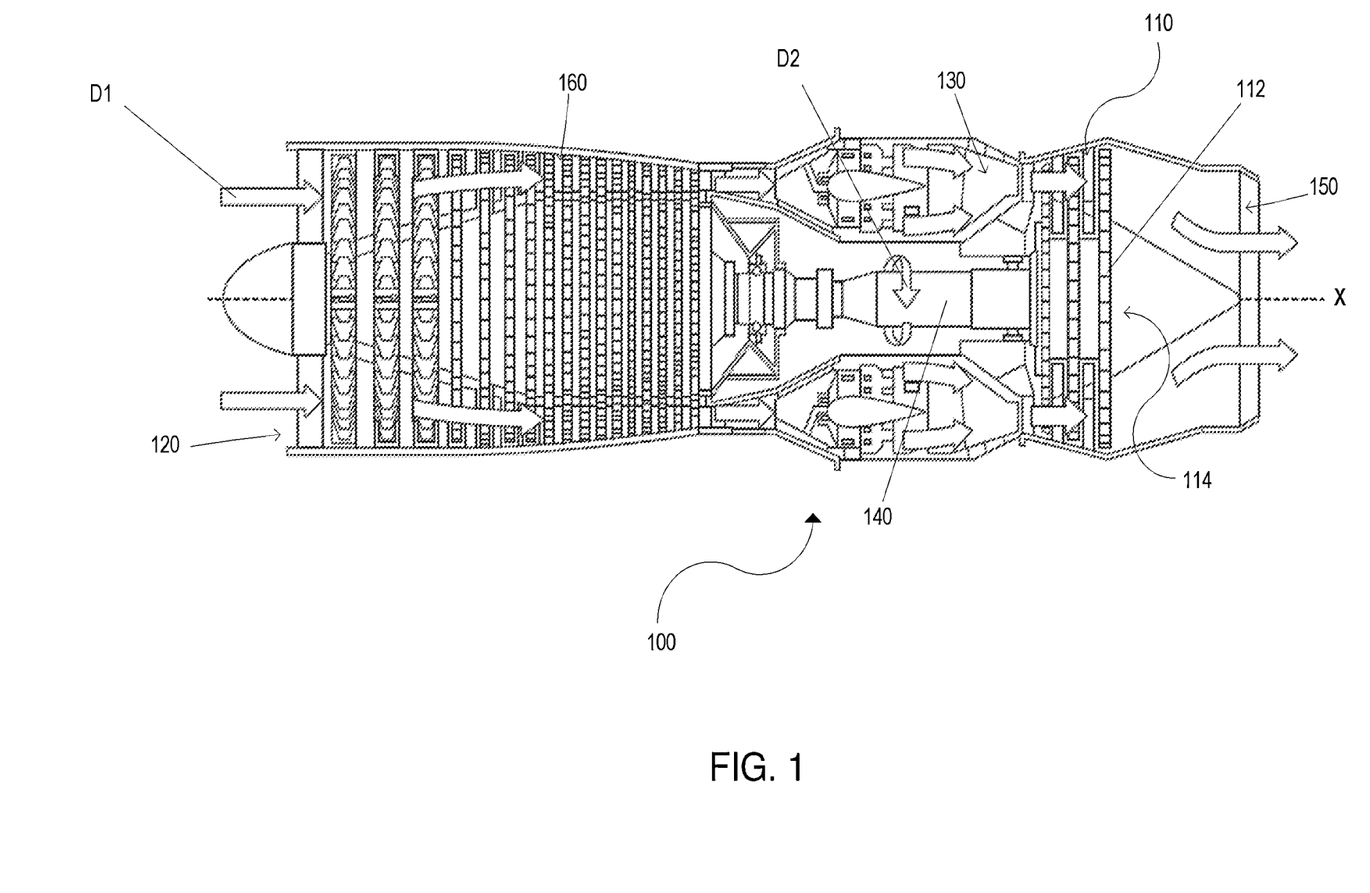
FIG. 1 illustrates a cross-sectional view of an example of a gas turbine engine.

FIG. 1 is a cross-sectional view of an example gas turbine engine 100. In some examples, the gas turbine engine 100 may supply power to and/or provide propulsion of vehicles such as an aircraft. Example aircrafts may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively, or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, and/or a perimeter defense or security system.

The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

The terms "upstream" and "downstream" may be used to describe the locations of sections and/or components of the gas turbine engine 100 with respect to the direction D1 of the flow of fluid through the gas turbine engine 100 during operation. For example, relative to the direction D1, the compressor section 160 may be downstream of the intake section 120 and upstream of the combustor section 130. The turbine section 100 may be downstream of the combustor section 130 and upstream of the exhaust section 150. Additionally or alternatively, one or more of the sections may include multiple stages that may be upstream and/or downstream of each other. For example, the turbine section 110 may include multiple stages and/or discs disposed adjacent to each other from an upstream end of the turbine section 110 to the downstream end of the turbine section. Additionally or alternatively, the compressor section 160 may also include multiple stage and/or discs.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which, in some examples, may correspond to a centerline X of the turbine 114.

Figure 2:
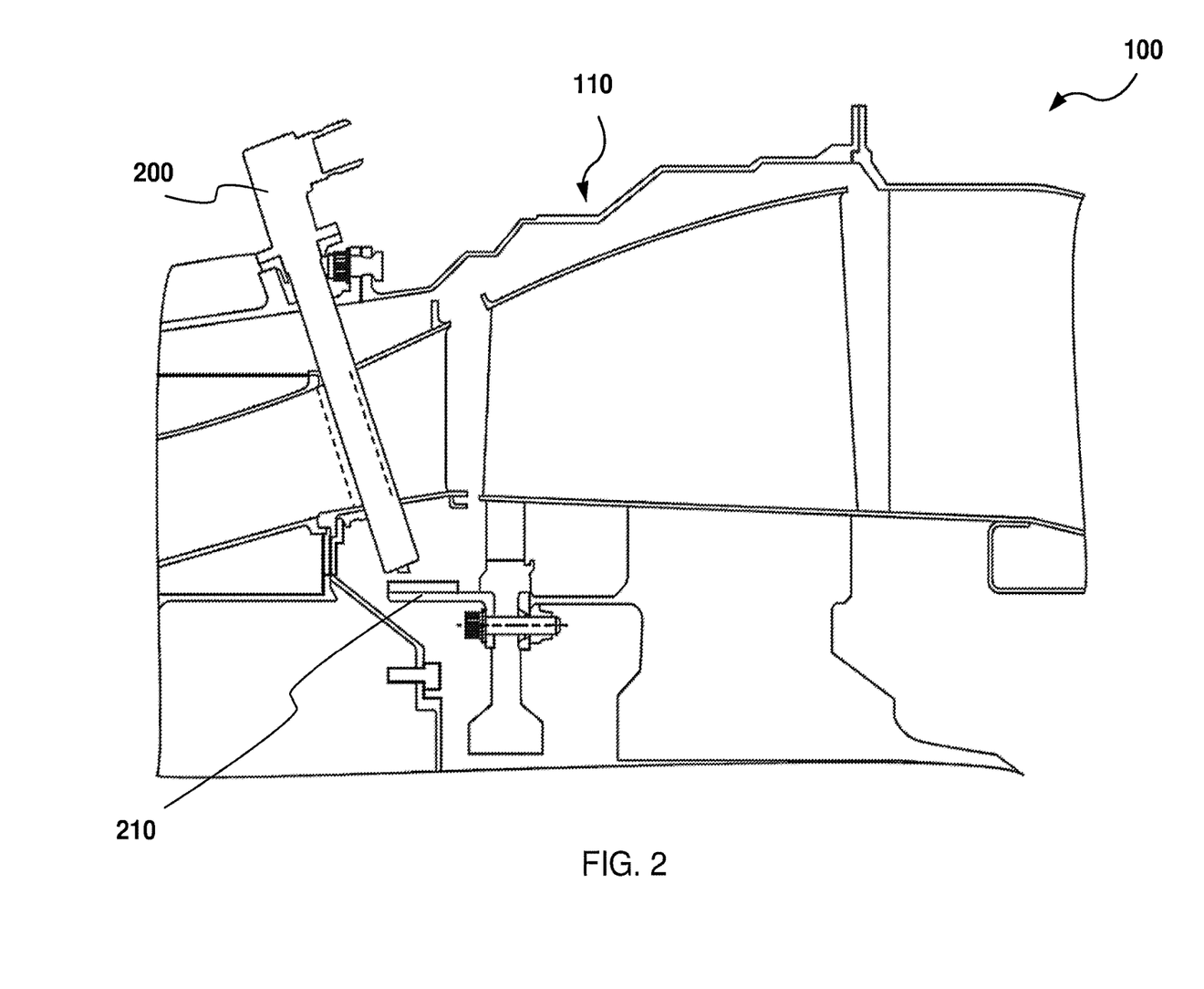
FIG. 2 illustrates a cross-sectional view of a portion of a gas turbine engine.

FIG. 2 illustrates a cross sectional view of a portion of the turbine engine 100. Note that FIG. 2 is a relatively high level illustration, and the turbine may contain more detail and/or additional components not shown. The portion of the turbine engine 100 includes the turbine section 110 and a sensor 200. The sensor 200 may be positioned at an upstream segment or portion of the turbine section 110, for example, at the upstream most end of the turbine section 110. For example, the sensor 200 may be positioned upstream of the upstream most turbine blade of the turbine section 110. Additionally or alternatively, the sensor 200 may be positioned downstream of the combustor section 130, for example, immediately adjacent to a downstream wall of the combustor section 130 and/or immediately adjacent to an upstream wall of the turbine section 100.

The sensor 200 may, for example, have an elongated shape. The sensor 200 may, for example, be cylindrical in shape. One end of the sensor 200 may be mounted or connected to part of the turbine engine 100, for example, to a casing of the turbine engine 100. The sensor 200 may extend into the turbine engine 100 and, for example, into the turbine section 110. Another end of the sensor 200 may extend into the turbine section 110 and be positioned, for example, just above a tone wheel 210 of the turbine engine 100.

The tone wheel may be a ferro-magnetic target for the sensor 200, which may be, for example, a variable reluctance sensor. A circumference of the tone wheel may have a discrete number of projections and recessions around an outer surface of the wheel. These geometric features may be referred to as teeth for regions of the circumference that are projected and troughs for the regions that are recessed. The tone wheel may be designed with 20 to 50 of these geometric features. The geometric features may excite or trigger the sensor.

The sensor may be nominally located 1 to 2 mm from the outer diameter of the tone wheel. The tone wheel and sensor may create a magnetic circuit where the flux from a magnet in the sensor may be coupled to the tone wheel. An air gap between the sensor and tone wheel may be comprised of several magnetic reluctance (similar to electrical resistance) paths, for example, the pole piece of the sensor, the air gap between the sensor and the tone wheel, and the reluctance of the tone wheel. As the tone wheel rotates past the pole piece of the sensor, the reluctance of the air gap may vary and may result in a variation in the magnetic flux coupled in the variable reluctance sensor. This flux variation may exhibit local maxima and minima values that induce voltage in the pickup coil via Faraday's law of induction. The voltage and frequency of the electrical signal generated from the coil may be proportional to the speed of the mechanical rotation of the tone wheel. For additional reference, the tone wheel may been referred to as a phonic wheel.

The tone wheel may be located in a relatively high temperature portion of the turbine section 100 of the engine, as compared to other portions of the turbine section, to monitor for over-speed and possible shaft-break detection in the high-pressure and high-power section of the turbine section 100. For example, high temperature portion may correspond to an engine station of 4.1 to 4.x for the location of the turbine section 100. The tone wheel may be located on the drive shaft of a power turbine assembly of the turbine section 100 to monitor the engine speed in this critical part of the turbine section 100.

The sensor 200 may be a sensor capable of monitoring speed and torque, for example, in the compressor 160 and/or turbine section(s) 110 of the turbine engine 100. For example, the sensor 200 may be a variable reluctance (VR) sensor. Additionally or alternatively, the sensor 200 may be a high temperature capacitive sensor, an optical sensor, a fiber optic (Fabry-Perot or Bragg) sensor, a laser based sensor, and/or a microwave based sensors. The sensor 200 may be used to monitor for normal and abnormal speed conditions of the compressor section 160, the turbine section 110, and/or the shaft 140 of the turbine engine 100. The sensor 200 may be used, for example, to detect a possible over-speed condition of the turbine engine 100. For example, the sensor 200 may output a speed signal that, for example, is used in an engine pressure ratio or other control algorithm by a controller or processor (not shown).

The controller may be any device that performs logic operations. The controller may be in communication with a memory (not shown). The controller may include a controller, engine control unit (ECU), engine control module (ECM), a general processor, a central processing unit, a computing device, an application specific integrated circuit (ASIC), a digital signal processor, a field programmable gate array (FPGA), a digital circuit, an analog circuit, a microcontroller, any other type of processor, or any combination thereof. The controller may include one or more elements operable to execute computer executable instructions or computer code embodied in the memory.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

The sensor 200 may, for example, include magnetic materials and/or wire materials that have a maximum allowable temperature, for example, between 260-316° C. (500-600° F.). Additionally, the ambient temperature of the upstream most end of the turbine section 110 may, for example, be 621-649° C. (1150-1200° F.) during operation.

Figure 3:
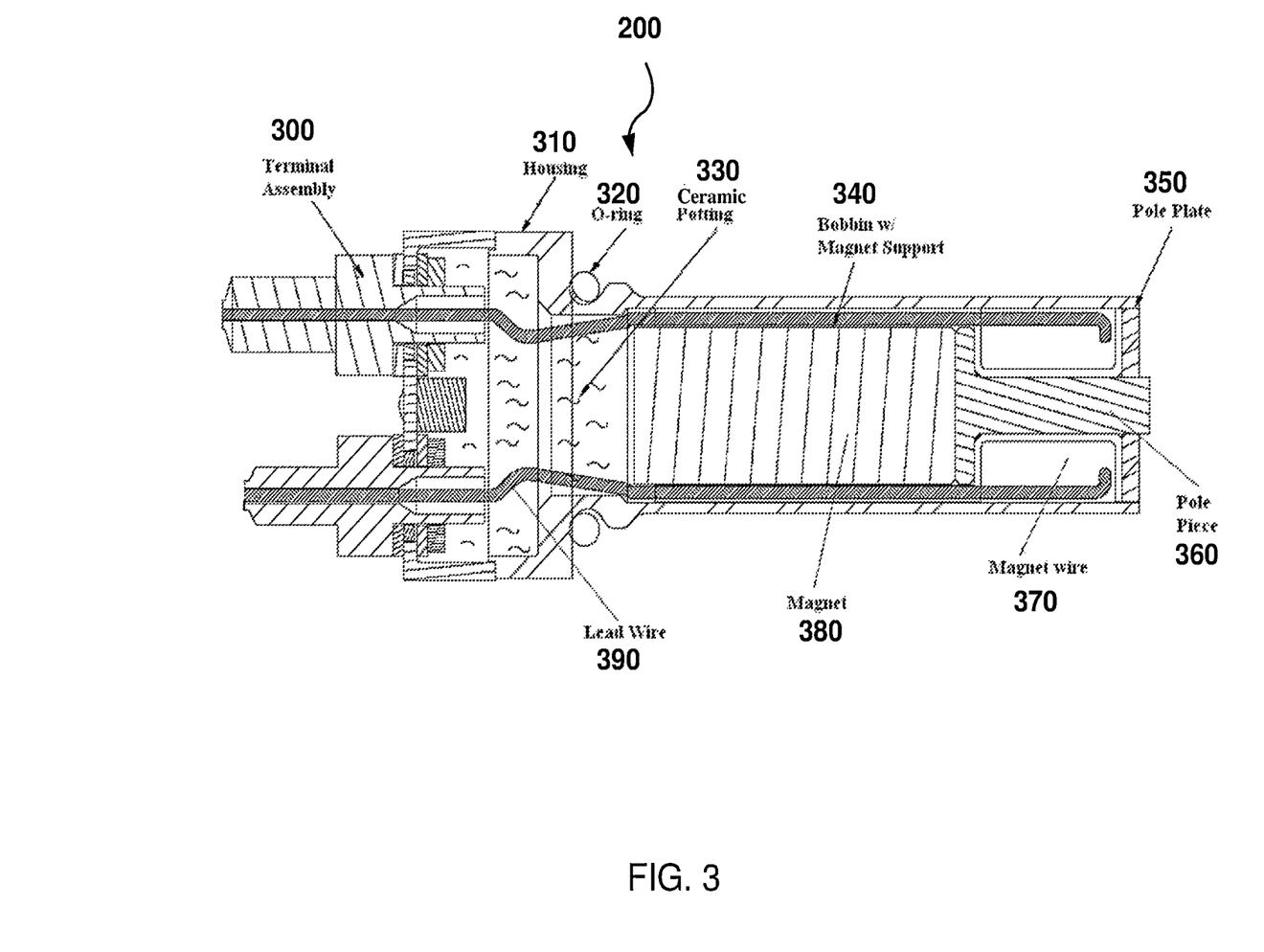
FIG. 3 illustrates a cross-sectional view of a variable reluctance sensor.
Figure 4:
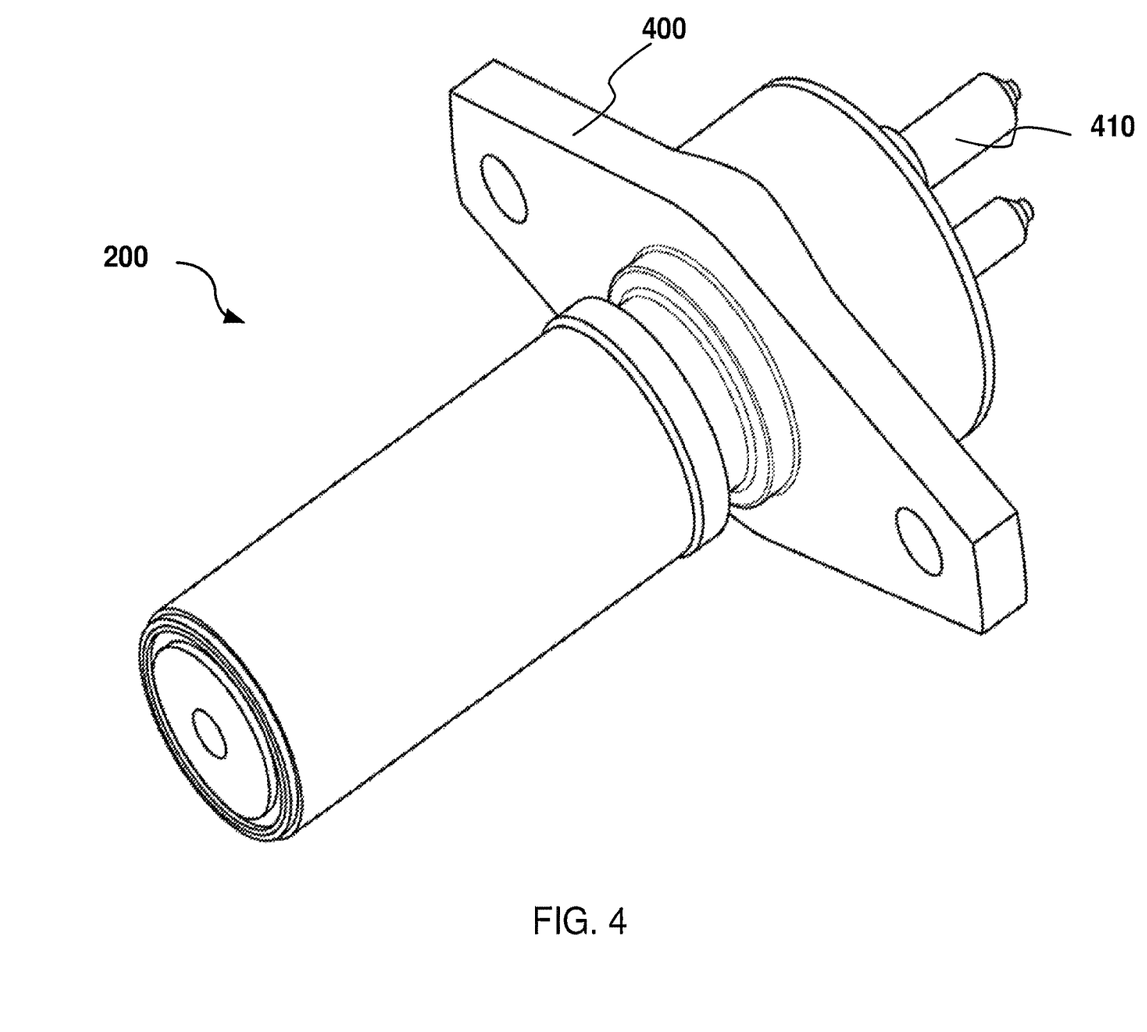
FIG. 4 illustrates an example of a variable reluctance sensor.

FIGS. 3-4 illustrate an example of a VR sensor assembly 200. FIG. 3 illustrates an example of a VR sensor 200 and its internal assemblies. FIG. 4 illustrates an example of a VR sensor 200 with an installation flange 400 and terminal blocks 410 to output the voltage signal. For example, the installation flange may be mounted to a case of the turbine engine 100, for example a case of the turbine section 110.

Figure 5:
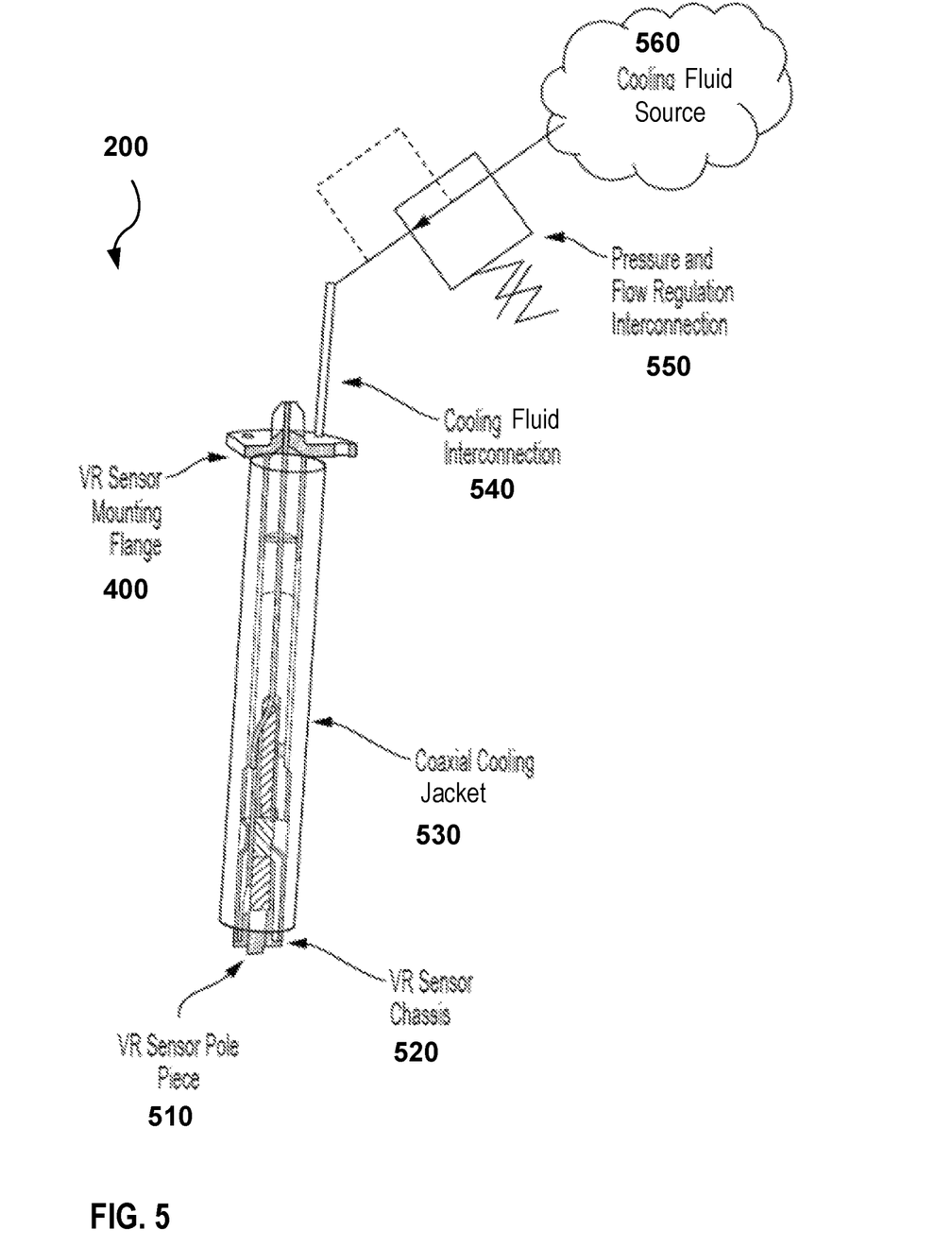
FIG. 5 illustrates a variable reluctance sensor with an example of a cooling jacket.

FIG. 5 illustrates an example of a VR sensor 200. The sensor 200 may include a sensor pole piece 510, a sensor chassis 520, a cooling jacket 530, an air interconnection 540, a pressure and flow regulation interconnection 550, and a cooling fluid supply 560.

The cooling jacket 530 may be disposed over or around the body of the sensor 200, and at least partially surround the sensor 200, the sensor pole piece 510, and/or the sensor chassis 520. The cooling jacket 530 may extend from the end of the sensor 200 near the mounting flange 400, down along the body of the sensor 200, to the opposite end of the sensor 200. The cooling jacket 530 may be shorter in length than the sensor and the sensor pole piece 510 and sensor chassis 520 may extend out past the end of the cooling jacket 530. The cooling jacket 530 may be, for example, cylindrical with a circular cross section. Alternatively, the cooling jacket 503 and/or sensor 200 may be non-circular, for example, ovular, square, rectangular, or asymmetrical in cross section. The cooling jacket 530 may be an metal, for example, the cooling jacket 530 material may be an alloy or other suitable material. Additionally or alternatively, the cooling jacket may be manufactured from a super-alloy, for example, Inconel, Hastelloy-X, Waspaloy, and/or any other super-alloy. The cross section of the cooling jacket 530 may be larger than a cross section of the body of the sensor 200. A gap to act as a cooling channel may be disposed between the body of the sensor 200 and the cooling jacket 530.

The end of the sensor 200 near the mounting flange 400 may be connected to a cooling fluid source 560 via a cooling fluid interconnection 540. The cooling fluid source 560 may, for example, be a stage of the compressor section 160 providing cooling air. For example, fluid may be bled off from the compressor section 160 and supplied to the cooling jacket 530 via the cooling fluid interconnection 540. The pressure and flow regulation interconnection 550 may be disposed along the cooling fluid 540 route. The pressure and flow regulation interconnection 550 may include, for example, a restrictive orifice, a valve, and/or any other component capable of regulating or changing the flow rate and/or pressure of the cooling fluid delivered to the cooling jacket 530. In other examples, cooling fluids other than air, such as another gas or a liquid, such as water, may be used. Additionally or alternatively, the cooling fluid may be any fluid capable of cooling at temperatures on the order of 1,110° F. For example the cooling fluid may be a high temperature oil, for example, Krytox™. Additionally or alternatively, the sensor assembly 200 and/or cooling jacket 530 assembly may comprise additionally or different features and/or geometries to enable different cooling configurations and/or cooling fluids. For example, the sensor assembly 200 and/or cooling jacket 530 assembly may comprise more complex inlet and outlet geometry to route the cooling fluid through the sensor chassis.

During operation, the cooling fluid may flow from the cooling fluid source 560, flow through and be regulated by the pressure and flow regulation interconnection 550, flow through the cooling fluid interconnection 540, and flow through the cooling jacket 530 along the body of the sensor 200. As the cooling fluid flows between the body of the sensor 200 and the cooling jacket 530 towards the open end of the jacket 530 (opposite the end disposed by the mounting flange 400), the cooling fluid may cooling the sensor 200 and sensor components by conducting heat away from the sensor 200. This may keep the sensor 200 below the sensor's maximum predetermined allowable temperature despite being disposed in an area of the gas turbine engine where the ambient temperature of the environment could be above the sensor's maximum allowable predetermined temperature.

Figure 6:
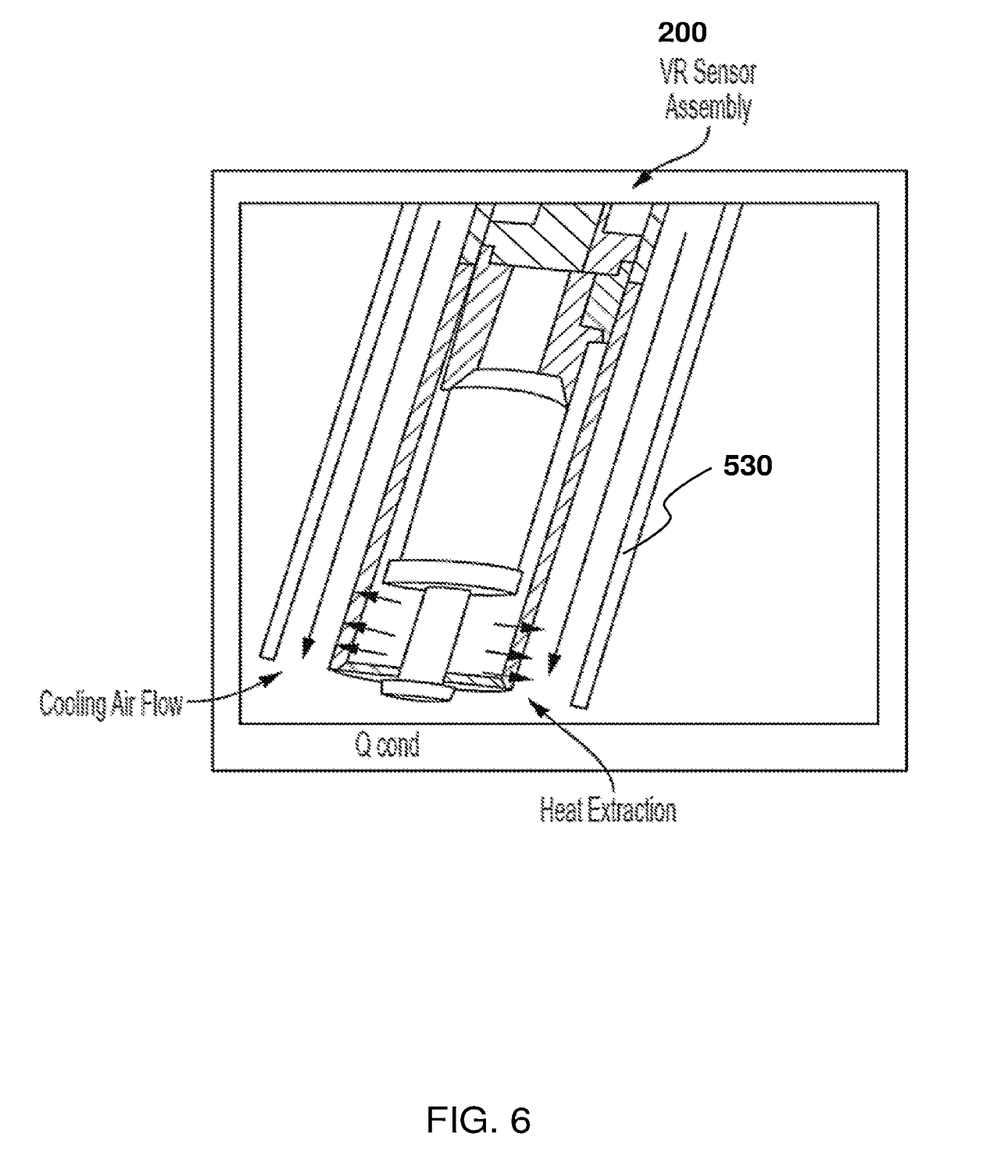
FIG. 6 illustrates a cross-sectional view of a portion of a variable reluctance sensor and a cooling jacket.

FIG. 6 illustrates another view of the end of the sensor 200 and cooling jacket 530 with the flow of cooling fluid, for example cooling air, flowing along the body of the sensor 200 between the sensor 200 and the cooling jacket 530 and extracting heat from the sensor 200.

Figure 7A:
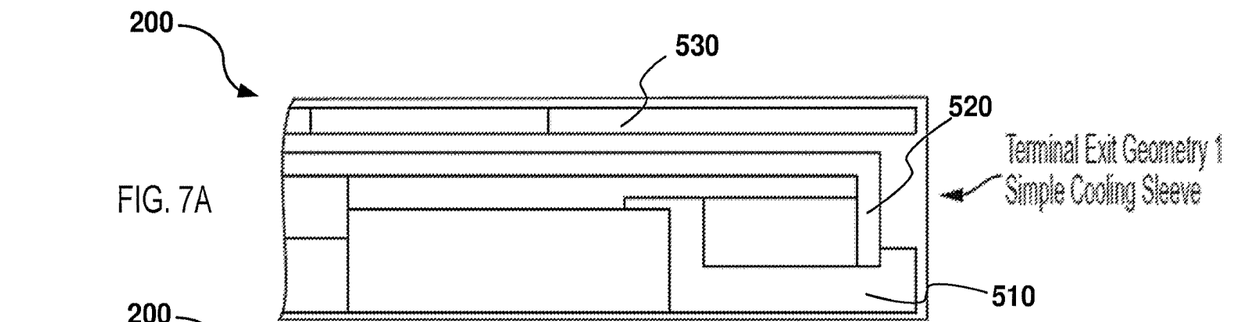
FIG. 7A illustrates a cross-sectional view of a first example portion of a variable reluctance sensor and a cooling jacket.
Figure 7B:
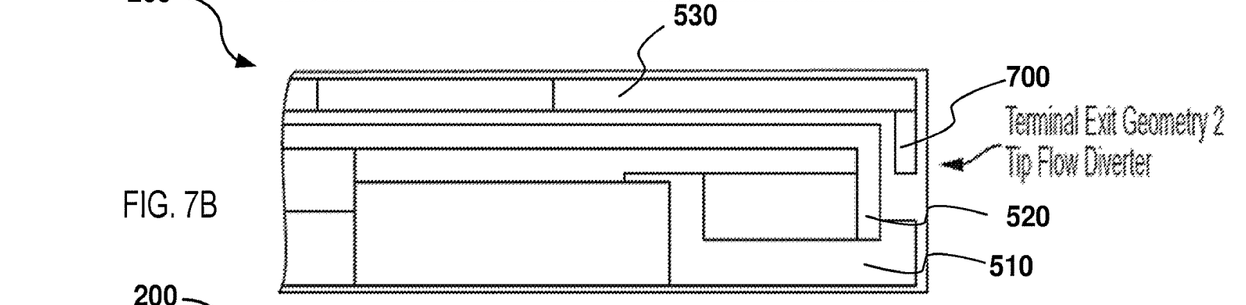
FIG. 7B illustrates a cross-sectional view of a second example portion of a variable reluctance sensor and a cooling jacket.
Figure 7C:
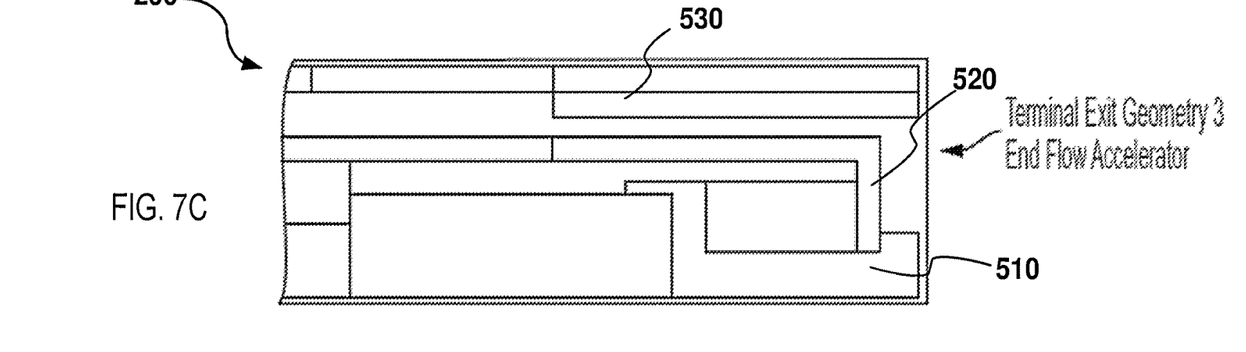
FIG. 7C illustrates a cross-sectional view of a third example portion of a variable reluctance sensor and a cooling jacket.

FIGS. 7A-C illustrate a variety of possibly geometries for the cooling jacket 530 at the end of the sensor 200 at a terminal exit (the end of the sensor 200 where the cooling fluid exits the cooling jacket, opposite the end with the mounting flange 400). FIG. 7A illustrates an exit geometry where the cooling jacket has a constant cross sectional area along the length of the sensor 200, and a cross section of the terminal exit is the same as an inner cross sectional area of the cooling jacket along the sensor 200.

FIG. 7B illustrates an exit geometry where the cooling jacket includes a flange 700 at the terminal exit, the flange extending perpendicular to the wall of the cooling jacket. The flange 700 may extend away from the cooling jacket 530 wall and towards the sensor pole piece 510, creating an exit with a cross sectional area that is smaller than the inner cross sectional area of the cooling jacket 530, and also possibly smaller that a cross section of the sensor chassis 520.

FIG. 7C illustrates an exit geometry where the cooling an inner cross sectional area of the cooling jacket 530 decreases in size closer to the terminal exit of the cooling jacket 530. For example, at the exit, the wall of the cooling jacket 530 may be thicker while maintaining a constant outer cross sectional area. The inner cross sectional area of the cooling jacket 530 at the exit (for example, along the last 20-30 mm at the end of the cooling jacket 530) may be smaller than the inner cross sectional area of the cooling jacket 530 at a point closer to the mounting flange 400, but still larger that a cross sectional area of the sensor chassis 520. The decrease in cross sectional area may be a gradual taper, or a series of on of more steps in wall thickness.

The exit geometry of the cooling jacket 530 may affect the cooling of the sensor 200. For example, by reducing the cross sectional area between the sensor chassis 520 and the cooling jacket 530, the flow velocity of the cooling fluid is increased, and the amount of heat convected away from the sensor 200 is increased. Therefore, the same level of cooling can be achieved, but with a reduced cooling fluid flow. Additionally, the pressure and flow regulation interconnection 550 can be used to reduce the cooling fluid flow to only what is needed to achieve the required cooling for the sensor based on the exit geometry of the cooling jacket 530 so that the least amount of cooling fluid possible is used.

Figure 8:
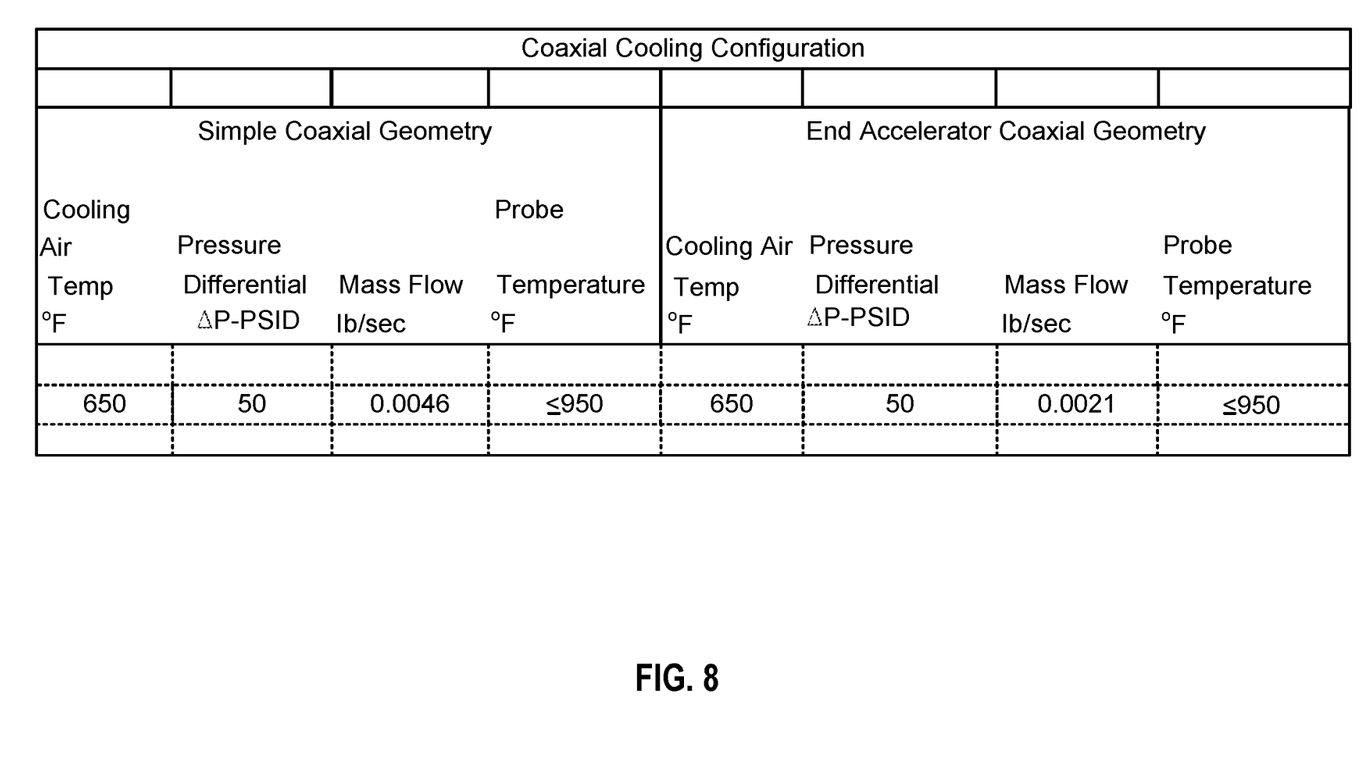
FIG. 8 illustrates a table with data related to variable reluctance sensors and cooling jackets.
Figure 9:
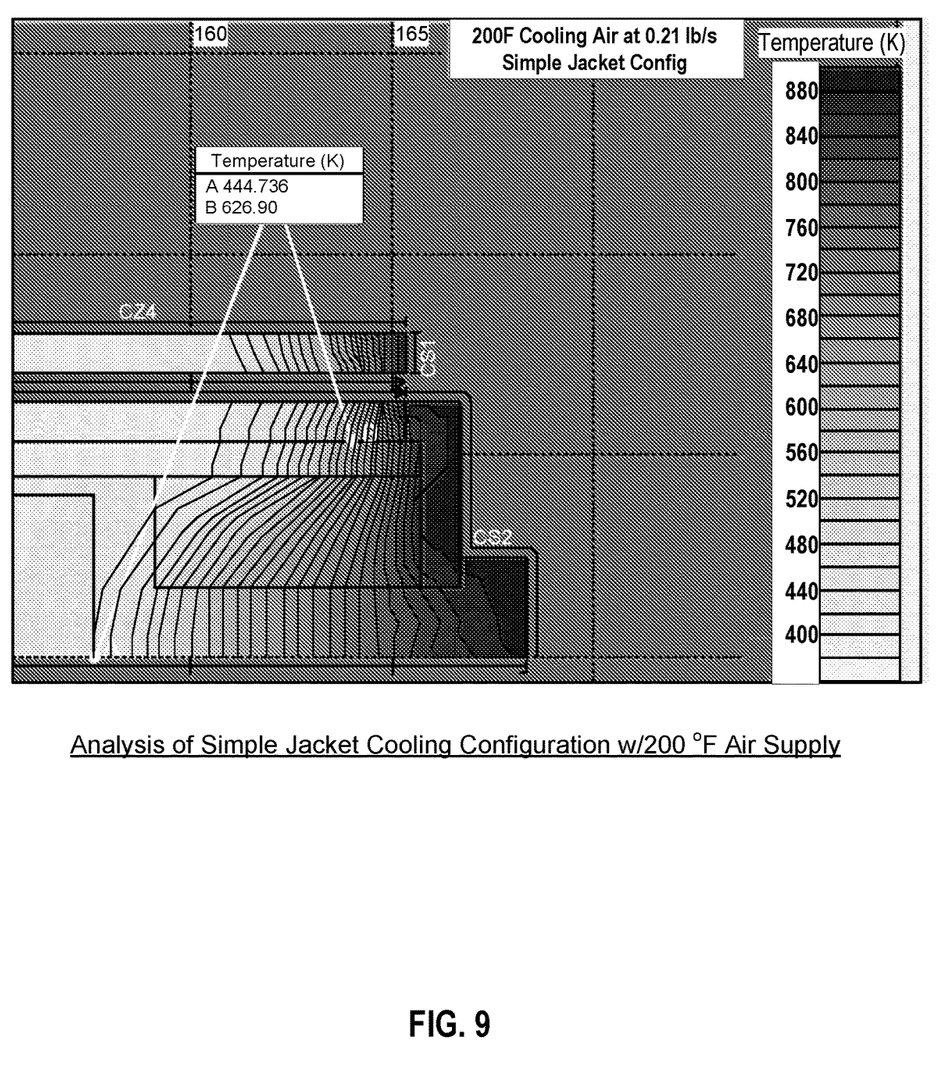
FIG. 9 illustrates a graph with example data related to a variable reluctance sensor and cooling jacket.
Figure 10:
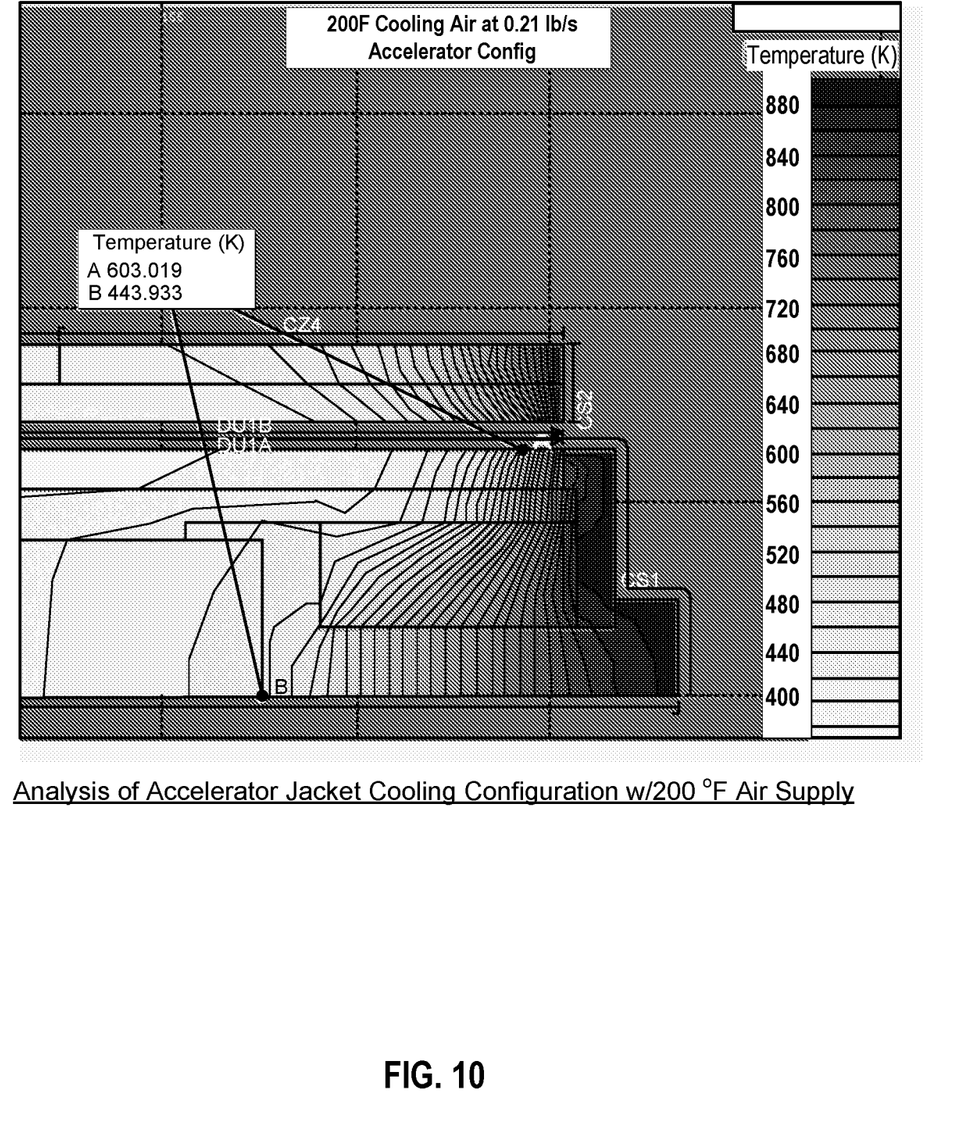
FIG. 10 illustrates a graph with example data related to a variable reluctance sensor and cooling jacket.

FIGS. 8-10 illustrate data regarding the different exit geometries and cooling parameters. In FIGS. 9 and 10, the darker shades of gray correspond to higher temperatures.

Figure 11:
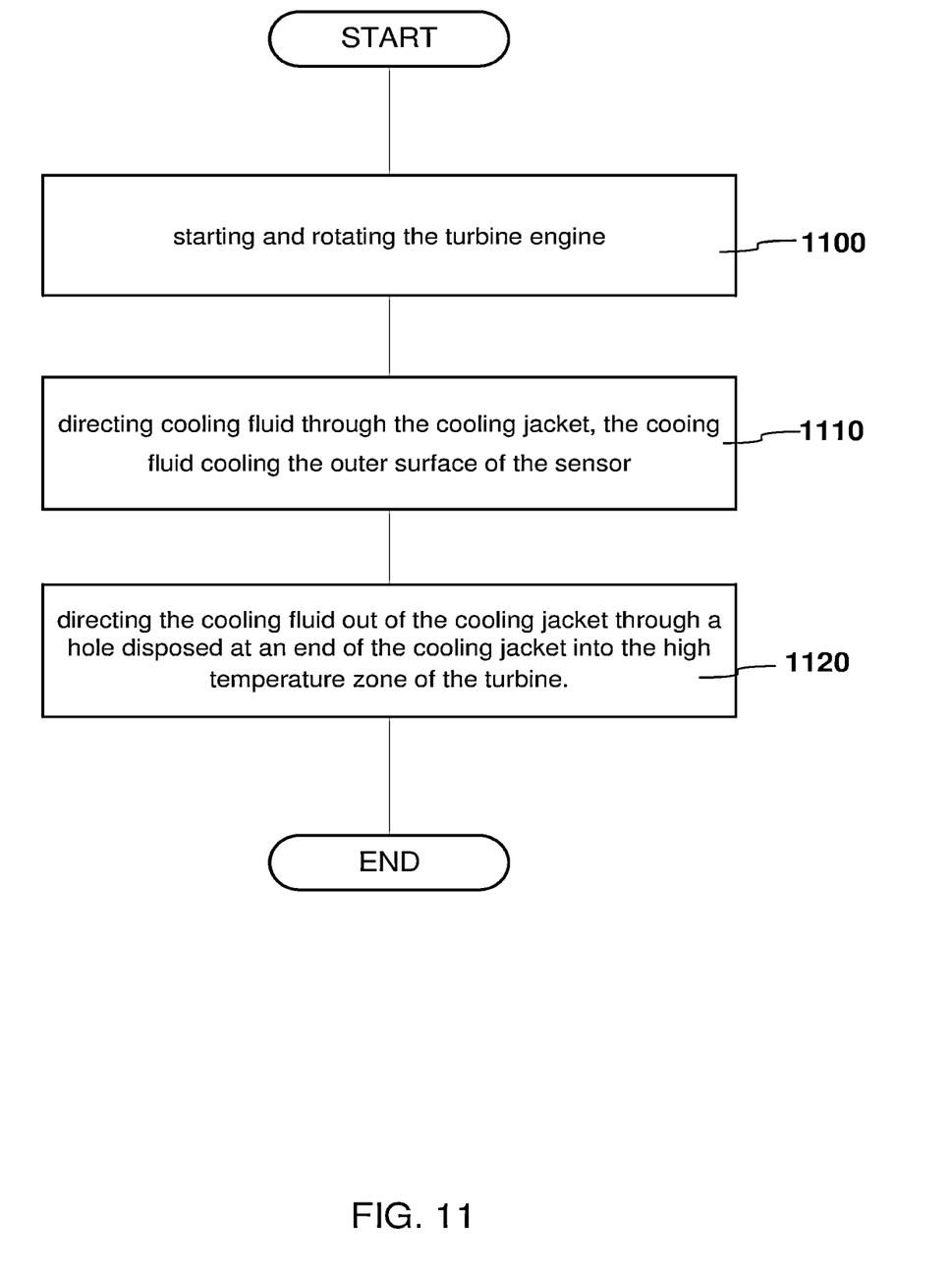
FIG. 11 illustrates a flow diagram of an example of the logic of a control unit.

FIG. 11 illustrates a flow diagram of an example of steps of a method to cool the sensor 200. For example, the engine 100 may be started and the turbine 130 rotating (1100). The cooling fluid may be directed through the cooling jacket 530 and the outer surface of the body of the sensor 200 (1110). The cooling fluid may be directed out of the cooling jacket 530 through a hole disposed at an end of the cooling jacket 530 (1120). The steps may include additional, different, or fewer operations than illustrated in FIG. 11. The steps may be executed in a different order than illustrated in FIG. 11.

The turbine engine 100 and/or sensor 200 may be implemented with additional, different, or fewer components. For example, the turbine engine may have additional or fewer sections. For example, the turbine engine 100 may include a memory and a processor. The sensor 200 may have additional or fewer components and materials. The engine 100 may have multiple sensors 200.

The logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a turbine engine comprising: a compressor section of the turbine engine; a combustion section of the turbine engine, the combustion section downstream of the compressor section; a turbine section of the turbine engine, the turbine section downstream of the combustion section; and a sensor for speed detection, the sensor disposed at an upstream segment of the turbine section, wherein the sensor includes a cooling jacket.

A second aspect relates to the turbine engine of aspect 1, wherein the sensor includes a sensor body, the cooling jacket comprising a cavity surrounding at least a portion of the sensor body.

A third aspect relates to the turbine engine of any preceding aspect, wherein the sensor is disposed upstream of a forward-most turbine blade.

A fourth aspect relates to the turbine engine of any preceding aspect, wherein the cooling jacket comprises a cylinder within which the sensor is disposed, the cooling jacket concentric with the sensor and extending along a length of the sensor, wherein an outer diameter of the sensor is smaller than an inner cross-sectional area of the cooling jacket.

A fifth aspect relates to the turbine engine of any preceding aspect, wherein the cooling jacket comprises an opening at an end of the jacket.

A sixth aspect relates to the turbine engine of any preceding aspect, wherein a diameter of the opening of the cooling jacket is larger than an outer diameter of the sensor.

A seventh aspect relates to the turbine engine of any preceding aspect, wherein a diameter of the opening of the cooling jacket is smaller than an outer diameter of the sensor.

An eighth aspect relates to the turbine engine of any preceding aspect, wherein the inner diameter of the cooling jacket is constant along the length of the cooling jacket.

A ninth aspect relates to the turbine engine of any preceding aspect, wherein the inner diameter of the cooling jacket varies along the length of the cooling jacket.

A tenth aspect relates to the turbine engine of any preceding aspect, wherein the inner diameter of the cooling jacket decreases in size towards an end of the cooling jacket.

An eleventh aspect relates to a turbine engine comprising: a compressor section of the turbine engine; a combustion section of the turbine engine, the combustion section downstream of the compressor section; a turbine section of the turbine engine, the turbine section downstream of the combustion section; a sensor for speed detection, the sensor disposed at a upstream segment of the turbine section; and a cooling jacket encasing at least a portion of the sensor, wherein a cooling fluid is in fluid communication with the cooling jacket and an outer surface of the sensor, the cooling jacket shaped to direct cooling fluid around the sensor.

A twelfth aspect relates to the turbine engine of any preceding aspect, wherein the cooling fluid is in fluid communication with an upstream section of the turbine engine, the cooling jacket shaped to receive the cooling fluid from the upstream section and distribute the cooling fluid around the sensor.

A thirteenth aspect relates to the turbine engine of any preceding aspect, wherein the sensor has a maximum temperature of 510° C.

A fourteenth aspect relates to the turbine engine of any preceding aspect, wherein the sensor is a variable reluctance sensor.

A fifteenth aspect relates to the turbine engine of any preceding aspect, wherein the turbine section has an operating temperature of at least 593° C.

A sixteenth aspect relates to the turbine engine of any preceding aspect, wherein the upstream section is the compressor section of the turbine engine.

A seventeenth aspect relates to a method of cooling a sensor in a turbine engine, the method comprising: starting and rotating the turbine engine, the sensor disposed at a upstream segment of a turbine section of the turbine engine, and a cooling jacket disposed at least partially around the sensor, wherein an inner cross sectional area of the cooling jacket being larger than an outer cross sectional area of the sensor; directing cooling fluid through the cooling jacket, the cooing fluid cooling the outer surface of the sensor; and directing the cooling fluid out of the cooling jacket through a hole disposed at an end of the cooling jacket.

An eighteenth aspect relates to the method of aspect 17, wherein during operation the turbine section reaches a temperature of at least 621° C., wherein the cooling fluid keeps a surface temperature of the outer surface of the sensor below 510° C.

A nineteenth aspect relates to the method of any preceding aspect further comprising the step of routing the cooling fluid through a restrictive orifice before the cooling fluid cools the outer surface of the sensor.

A twentieth aspect relates to the method of any preceding aspect further comprising the step of position an end of the sensor to maintain a line of sight with a tone wheel of the turbine section.

In addition to the features mentioned in each of the independent aspects enumerated above, some examples may show, alone or in combination, the optional features mentioned in the dependent aspects and/or as disclosed in the description above and shown in the figures.

What is claimed is:

1. A turbine engine comprising:
a compressor section of the turbine engine;
a combustion section of the turbine engine, the combustion section downstream of the compressor section;
a turbine section of the turbine engine, the turbine section downstream of the combustion section; and
a sensor for detecting the speed of a surface of the turbine section, the sensor disposed at an upstream segment of the turbine section,
wherein the sensor includes a cooling jacket surrounding the sensor, the cooling jacket including an opening at an end of the cooling jacket disposed within the turbine section of the turbine engine for discharging cooling fluid adjacent to the surface of the turbine section from a radially innermost end of the cooling jacket.

2. The turbine engine of claim 1, wherein the sensor includes a sensor body, the cooling jacket comprising a cavity surrounding at least a portion of the sensor body.

3. The turbine engine of claim 1, wherein the sensor is disposed upstream of a forward-most turbine blade.

4. The turbine engine of claim 2, wherein the cooling jacket comprises a cylinder within which the sensor is disposed, the cooling jacket concentric with the sensor and extending along a length of the sensor, wherein an outer diameter of the sensor is smaller than an inner cross-sectional area of the cooling jacket.

5. The turbine engine of claim 1, wherein a diameter of the opening at the end of the cooling jacket disposed inside the turbine section of the turbine engine is larger than an outer diameter of the sensor.

6. The turbine engine of claim 1, wherein a diameter of the opening at the end of the cooling jacket disposed inside the turbine section of the turbine engine is smaller than an outer diameter of the sensor.

7. The turbine engine of claim 1, wherein an inner diameter of the cooling jacket is constant along an entire length of the cooling jacket.

8. The turbine engine of claim 4, wherein an inner diameter of a first portion of the cooling jacket is smaller than an inner diameter of a second portion of the cooling jacket, the first portion disposed near the end of the cooling jacket disposed inside the turbine section, the second portion disposed upstream from the first portion.

9. The turbine engine of claim 4, wherein an inner diameter of the cooling jacket decreases in size towards an end of the cooling jacket.

10. A turbine engine comprising:
a compressor section of the turbine engine;
a combustion section of the turbine engine, the combustion section downstream of the compressor section;
a turbine section of the turbine engine, the turbine section downstream of the combustion section;
a sensor for detecting the speed of a surface of the turbine section, the sensor disposed at a upstream segment of the turbine section; and
a cooling jacket encasing at least a portion of the sensor, the cooling jacket including an opening at an end of the cooling jacket disposed within the turbine section of the turbine engine for discharging cooling fluid adjacent to the surface of the turbine section from a radially innermost end of the cooling jacket,
wherein a cooling fluid is in fluid communication with the cooling jacket and an outer surface of the sensor, the cooling jacket shaped to direct cooling fluid around the sensor.

11. The turbine engine of claim 10, wherein the cooling fluid is in fluid communication with an upstream section of the turbine engine, the cooling jacket shaped to receive the cooling fluid from the upstream section and distribute the cooling fluid around the sensor.

12. The turbine engine of claim 10, wherein the cooling jacket and cooling fluid are configured to keep a surface temperature of the outer surface of the sensor below 510° C.

13. The turbine engine of claim 10, wherein the sensor is a variable reluctance sensor.

14. The turbine engine of claim 10, wherein the turbine section has an operating temperature of at least 593° C.

15. The turbine engine of claim 11, wherein the upstream section is the compressor section of the turbine engine.

16. A method of cooling a sensor for detecting the speed of a surface of a turbine section in a turbine engine, the method comprising:
starting and rotating the turbine engine, the sensor disposed at a upstream segment of a turbine section of the turbine engine, and a cooling jacket disposed at least partially around the sensor, wherein an inner cross sectional area of the cooling jacket being larger than an outer cross sectional area of the sensor;
directing cooling fluid through the cooling jacket, the cooing fluid cooling an outer surface of the sensor; and
directing the cooling fluid out of the cooling jacket through a hole disposed at an end of the cooling jacket disposed within the turbine section of the turbine engine for discharging cooling fluid adjacent to the surface of the turbine section from a radially innermost end of the cooling jacket.

17. The method of claim 16, wherein during operation the turbine section reaches a temperature of at least 621° C., wherein the cooling fluid keeps a surface temperature of the outer surface of the sensor below 510° C.

18. The method of claim 16 further comprising the step of routing the cooling fluid through a restrictive orifice before the cooling fluid cools the outer surface of the sensor.

19. The method of claim 16 further comprising the step of position an end of the sensor to maintain a line of sight with a tone wheel of the turbine section.

* * * * *